Sept. 29, 1970     L. R. POE     3,531,174
LIMITED LOAD LATCH
Filed Dec. 6, 1968     2 Sheets-Sheet 1
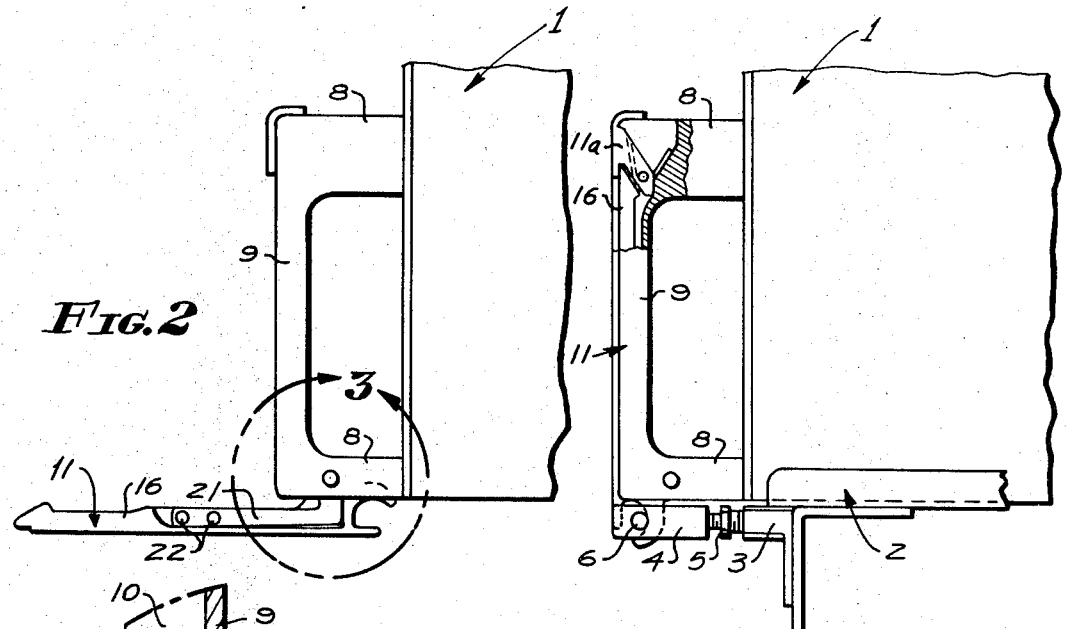
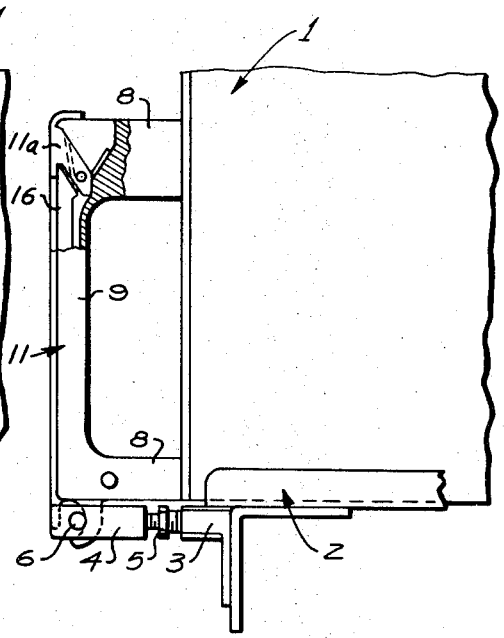
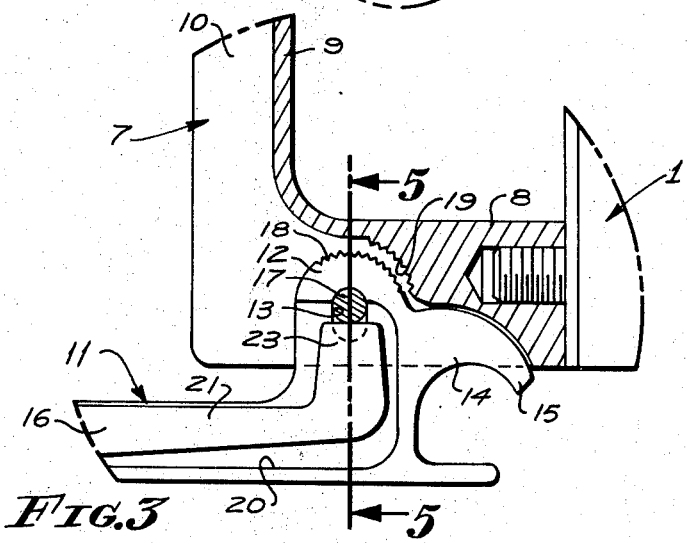
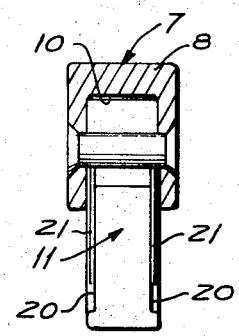
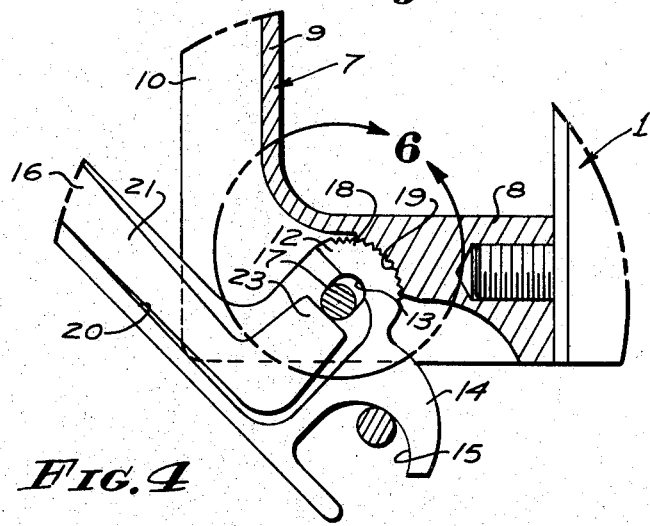
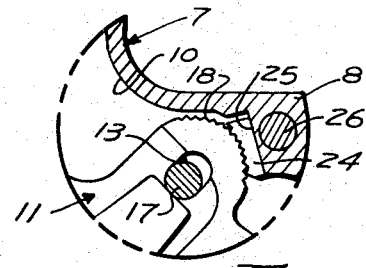
INVENTOR.
LLOYD RICHARD POE
BY
*Lyon & Lyon*
ATTORNEYS

INVENTOR.
LLOYD RICHARD POE
BY
ATTORNEYS

United States Patent Office 3,531,174
Patented Sept. 29, 1970

3,531,174
LIMITED LOAD LATCH
Lloyd Richard Poe, Beverly Hills, Calif., assignor to Hartwell Corporation, Los Angeles, Calif., a corporation of California
Filed Dec. 6, 1968, Ser. No. 781,927
Int. Cl. A47b 88/00; E05c 19/12
U.S. Cl. 312—333                    8 Claims

ABSTRACT OF THE DISCLOSURE

A limited load latch in which a latch lever is provided with a slot which receives a journal pin and is capable of lateral movement within the limits of the slot; and, in which a pair of leaf springs, operable edgewise, are secured to the sides of the latch lever to bear against the spring and apply a relatively strong but yieldable force, holding the pin at one extremity of the slot.

BACKGROUND OF THE INVENTION

Electronic components of complex electronic equipment, such as but not limited to computer assemblies, are often divided into subassemblies carried by drawers which are individually assembled in supporting racks much like the drawers of a file cabinet. The rear ends of such drawers have a plurality of pin and socket connectors which must mate, when the drawer is fully closed.

The practice has been to provide a pair of latch handles for each drawer, each having a pivoted latch lever provided with a hook near the pivotal axis and a long lever arm so that the drawer may be forced to its fully closed position against the cumulative friction due to the interengagement of the connector parts. Should the connector parts or some of them be misaligned, the force exerted in operation of the handle or latch levers, may be sufficient to permanently damage the connectors and require costly repairs.

Also, in other fields such as in aircraft construction, flush latches are commonly used; for example, the type shown in Pats. 2,467,268; 2,639,178 and 2,717,796. These latches include a latch lever and a keeper lever, the latter being externally accessible for manual engagement and pivotable to release the latch lever. The latch lever includes a latching end which fits under a frame surrounding the door or panel on which the latch is mounted.

Tolerance problems have been encountered with respect to the latching end and the part engaged thereby. Pat. No. 2,717,796 illustrates a solution to this problem in the form of a yieldable plate carried by the latching end. However, it will be noted that the latches shown in these patents are formed of relatively thin gauge sheet metal as the loads imposed were relatively light. Subsequently, as aircraft speeds were increased, loads imposed materially increased. As a result, the keeper lever and latch lever, particularly, were machined from bar stock or special extrusions. The loads imposed between the latching end and engaged part became so severe that the solution indicated in Pat. No. 2,717,769 was no longer applicable, and it became necessary to hand fit the latching end of the latch lever at considerable cost.

SUMMARY OF THE INVENTION

The present invention provides a solution to both of the problems indicated, and accordingly, the objects of the invention include:

First, to provide a limited load latch which includes an elongated latch lever pivoted near one end by a pin which fits in a clearance opening to provide limited lateral displacement of the latch lever, and a pair of unique flat springs secured to opposite sides of the latch lever and arranged to bear edgewise against the pin so that the springs deflect in the planes defined by the springs rather than perpendicularly thereto, whereby the needed resistance to displacement may be readily supplied.

Second, to provide a limited load latch, of the type indicated in the preceding object, which is applicable to drawers containing electronic equipment including separable connectors which plug into related equipment when the drawer is closed; the latch incorporating novel means which prevents further movement of the latch upon deflection of the springs a predetermined amount so that loads on the connectors may be controlled.

Third, to provide a limited load latch which may be arranged as a flush latch as used in aircraft construction whereby the load applied by the latch, when closed, is determined by load limiting springs and the tolerances between engaging parts may be relaxed.

DESCRIPTION OF THE FIGURES

FIG. 1 is a side view, showing one form of the limited load latch in its secured position, and indicating fragmentarily a drawer on which the latch is mounted and the rack which receives the drawer.

FIG. 2 is a similar side view, showing the latch in its released position, and indicating the drawer fragmentarily.

FIG. 3 is an enlarged fragmentary sectional view, taken within circle 3 of FIG. 2, showing the latch in its open position.

FIG. 4 is a similar fragmentary sectional view, showing the latch in engagement with a keeper pin and under sufficient load to secure the latch lever against further movement.

FIG. 5 is a sectional view, taken through 5—5 of FIG. 3.

FIG. 6 is a fragmentary sectional view, taken within circle 6 of FIG. 4, showing a modified form of the lever locking means.

Figure 7:
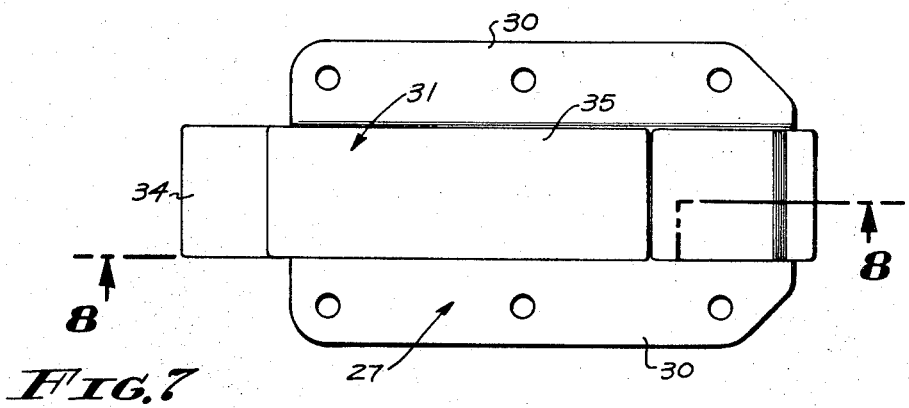
FIG. 7 is a plan view of a modified form of the limited load latch.

Reference is first directed to the limited load latch shown in FIGS. 1 through 5. The latch here illustrated is intended to be mounted on a drawer 1, of the type which carries an assembly of electronic components, and provided at its inner end with coupling components, not shown, which engage mating components as the drawer approaches its closed position. The drawer is mounted in a rack structure 2 and is removable therefrom. The rack structure is provided with a pair of brackets 3 for each drawer, one of which is illustrated, which is connected to an outwardly extending mounting bar 4 by an adjustment screw 5, provided with a transversely extending keeper pin 6. Each drawer receives a pair of U-shaped handles 7, which include end members 8, secured to the front of the drawer 1, and joined by a connecting member 9. The connecting member and the lower end member are provided with a latch lever slot 10. The construction so far described may be considered as conventional.

In the exercise of the present invention, the slot 10 receives a latch lever 11, having near one end, a journal pin boss 12, provided with a journal pin slot 13. Extending from one side of the boss 12 is a relatively short catch arm 14, terminating in a hook end 15. Extending from another side of the journal pin boss 12 is a relatively elongated handle arm 16, which in the closed position of the latch, extends along the slot 10 provided in the connecting member 9. The journal pin slot 13 receives a journal pin 17, located in the lowermost end member 8.

The journal pin boss 12 is provided with a peripheral serrated portion 18, which is normally spaced from a corresponding or mating serrated portion 19, formed in the slot 10, at one end thereof.

Opposite sides of the handle arm 16 are provided with shallow side recesses 20, which receive flat springs 21, secured intermediate the ends of the handle arm by fasteners 22. The extended ends of the springs 21 are provided with end fingers 23, which extend into the journal pin boss 12 and engage the journal pin 17 so as to force the journal pin to one extremity of the journal pin slot 13, as indicated in FIG. 3.

The extended end of the arm 16 of the handle 11 is releaseably held in its closed position by a spring loaded secondary latch lever 11a, as indicated in FIG. 1.

Operation of the limited load latch, shown in FIGS. 1 through 5, is as follows:

When the drawer is in its closed position, the arm 16 of the handle 11 is releaseably held in its closed position shown in FIG. 1. The secondary latch lever 11a is manually rotated to free the handle arm 16 permitting the handle arm 16 to move toward its open position shown in FIG. 2. Thus when the drawer 1 is in its open position, the handle arm 16 is also in its open position, extending horizontally; that is, essentially at right angles to the connecting member 9 of the U-shaped handle. This is the position also shown in FIG. 3. The drawer is moved toward its closed position with the handle arm 16 in its open position until the hook end 15 passes over the corresponding keeper pin 6, whereupon the latch level 11 is rotated clockwise, as viewed in FIGS. 2 and 3, in exerting an inward force on the drawer 1 calculated to press the components of the separable connectors into mutual engagement. However, should this force exceed a predetermined value, the resistance of the springs 21 is overcome, causing the journal pin 17 to bend the springs and causing the serrated portions 18 and 19 to move toward each other. If the resistance to this movement is excessive, indicating that the connectors at the rear end of the drawer may not be in alignment, the serrated portions 18 and 19 actually engage and prevent further rotation of the handle lever. This is the condition shown in FIG. 4. The operator then reopens the drawer to determine what may have prevented closing of the drawer.

It will be noted that each spring bends in the plane defined by the spring rather than perpendicular thereto and that the width as well as the thickness of the spring may be varied to exert the desired resistance to the loads applied. It will also be noted that although the springs offer no appreciable weight to the structure as a whole, that they can exert a substantial resistance to deformation.

Reference is now directed to FIG. 6. In place of the serrated portion 19 in the handle, a serrated wedge member 24 is substituted; that is, the wedge 24 has a serrated side which meshes with the serrated portion 18, and a smooth side which engages a bearing face 25 formed in the corresponding extremity of the latch lever slot 10. The wedge is capable of slight movement and is held in position by a magnet 26 retained in a transverse accommodation aperture formed in the lower end member 8 of the handle 7.

Reference is now directed to FIGS. 7 through 10. In the construction here illustrated, the limited load latch is incorporated in a flush latch which is intended to be installed in the surface or skin structure of an airplane. The latch as here illustrated includes a latch frame 27, having parallel side members 28, joined by a pair of connecting webs 29. The side members are provided with relatively outwardly extending coplanar side flanges 30, which are adapted to be secured to the underside of the door or panel A intended to be set in the surface structure of the aircraft.

The side members 28 receive therebetween a latch lever 31 which includes a journal pin receiving portion 32, from one side of which extends a latch or catch arm 3, terminating in an offset catch finger 34. Also extending from the journal pin receiving portion, essentially at right angles to the catch arm 33 but parallel to the catch finger 34, is a handle arm 35, having an offset catch 36 at its extremity. The journal pin receiving portion is provided with a slot 37 which receives a journal pin 38, secured in the side members 28. The slot and the journal pin permit limited translation motion of the latch lever.

Figure 8:
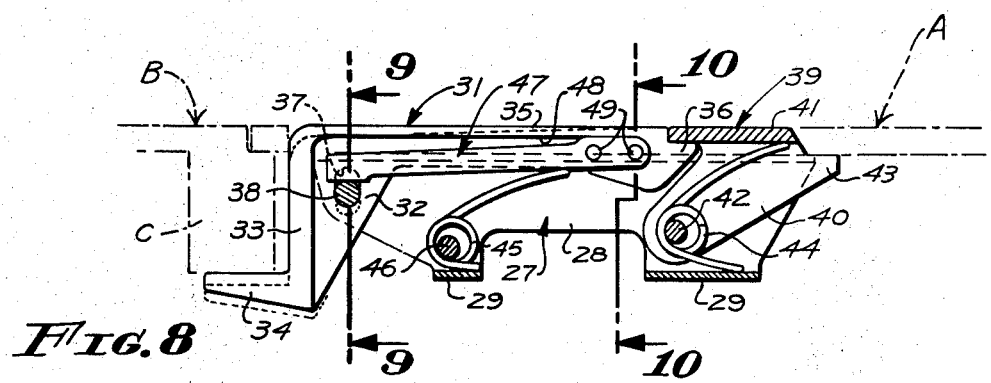
FIG. 8 is a partial side view, partial sectional view, taken substantially through 8—8 of FIG. 7.
Figure 9:
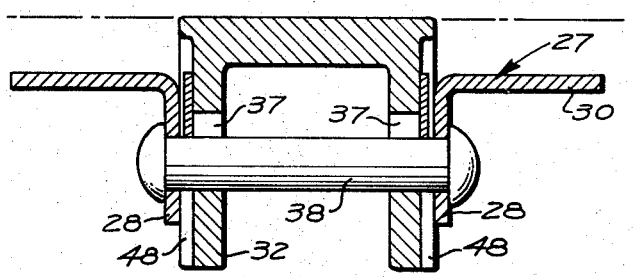
FIG. 9 is an enlarged transverse sectional view, taken through 9—9 of FIG. 8.
Figure 10:
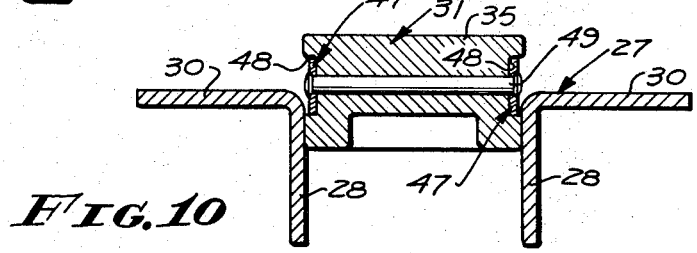
FIG. 10 is another enlarged transverse sectional view, taken through 10—10 of FIG. 8.

Also mounted between the side members 28 is a keeper lever 39, having side flanges 40, which confront the side members 28, and a connecting web 41, engageable with the catch extremity 36 of the latch lever 31. The side flanges 40 are pivotally mounted on a pin 42 extending between the side members 28. The side flanges 40 are provided with catch extremities 43 which engage the door or panel A. When the limited load latch is in its secured position, the outer surface of the handle arm 35 is essentially flush with the outer surface of the door or panel A, and similarly, the connecting web 41 is flush therewith, with one margin overlying the catch extremity 36, and the catch extremities 43 of the side flanges extending under the door or panel A, as shown in FIG. 8.

A spring 44, wrapped about the pivot pin 42, tends to hold the keeper lever in its closed position so as to restrain the handle arm 35. A second spring 45, wrapped about a retainer pin 46 tends to urge the handle arm 35 outwardly.

The door or panel A sets within a suitable frame B, which includes a stop C engaged by the catch finger 34. Heretofore, the location of the stop C has been critical. If it were too shallow, the door or panel would be loose; if it were too deep, the latch lever 31 could not be moved to its closed position. In the exercise of the present invention, this is solved by flat springs 47 corresponding to the flat springs 21, which are mounted in shallow side recesses 48 provided in the sides of the handle arm 35, and held there by fasteners 49. In addition, the edges of the springs 47 may be restrained by the margins of the side recesses in the region of the secured ends of the springs.

As in the first described structure, the extended ends of the springs 47 bear edgewise against the journal pin 38. Thus, if the location of the stop C is too deep, the latch lever 31 may still be closed although its upper surface may not be quite flush with the outer surface of the door or panel A, as indicated by dotted lines in FIG. 8. It should be noted, however, that inward displacement of the latch lever is exaggerated so that in practice even though the latch lever may be depressed, the extent of the depression is not sufficient as to have any noticeable aerodynamic effect.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A limited load latch, comprising:
   (a) a latch lever having a pivot slot, a relatively short catch arm extending from one side of said pivot slot, and a relatively long handle arm extending from another side of said pivot slot;
   (b) a journal pin received in said pivot slot;
   (c) and at least one flat spring secured along a side of said handle arm and engaging said journal pin edgewise of said spring for flexure of said spring in the plane defined by said spring upon displacement of said journal pin in said slot.
2. A latch, as defined in claim 1, wherein:
   (a) the handle arm of said latch lever is provided with shallow recesses on opposite sides to receive a pair of said springs.

3. A latch, as defined in claim 1, which further includes:
  (a) a handle member, said latch lever being pivotally mounted in said handle member;
  (b) said latch lever and said handle member have interlocking portions mutually engageable on predetermined displacement of said journal pin relative to said slot to prevent further rotation of said latch lever relative to said handle member.

4. A latch, as defined in claim 1, which further includes:
  (a) a mounting frame, said latch lever being pivotally retained in said mounting frame, said catch arm is offset from said handle arm for engagement with a stop and deflection of said spring causes said catch arm to compensate for difference in the location of a stop.

5. A limited load latch for installation on a drawer, slidable in a drawer rack having a keeper pin, said latch comprising:
  (a) a handle member secured to the outer face of said drawer and defining a latch lever channel;
  (b) a latch lever having a journal slot, a relatively short catch arm extending from one side of said journal slot, and a relatively long lever handle extending from another side of said journal slot;
  (c) a journal pin traversing said channel and received in said journal slot, said journal pin being located to permit movement of said catch arm into engagement with said keeper pin and movement of said handle lever into and out of said channel;
  (d) and at least one flat spring secured at one side of said handle arm and extending into edge engagement with said journal pin, said spring being deflectable in the plane defined by said spring within the limits determined by said journal slot.

6. A latch, as defined by claim 5, wherein:
  (a) said latch lever and said handle member having interlocking surfaces adjacent said journal slot mutually engageable upon predetermined deflection of said spring to lock said latch lever relative to said handle.

7. A flush latch adapted to be installed in a panel set flush in a surrounding frame having a stop element, said latch comprising:
  (a) a mounting member adapted to be secured in said panel:
  (b) a latch lever having a journal slot, a catch arm extending in one direction therefrom and a handle arm extending in another direction therefrom;
  (c) a journal pin secured in said mounting member and received in said slot to position said catch arm for engagement with said stop element when said handle arm is flush in said panel;
  (d) and at least one flat spring disposed at one side of said handle arm and engaging said journal pin edgewise to displace said latch lever and catch arm with respect to said journal pin thereby to compensate for variation in the location of said stop element.

8. A latch, as defined in claim 7, wherein:
  (a) said handle arm is provided with shallow recesses in opposite sides thereof;
  (b) and a pair of flat springs are received therein.

References Cited

UNITED STATES PATENTS

| Re. 25,243 | 9/1962 | Kobitter | 312—333 |
| 3,123,419 | 3/1964 | Maxwell | 312—333 |
| 3,140,905 | 7/1964 | Trotter et al. | 312—333 XR |

JORDAN FRANKLIN, Primary Examiner

G. H. KEIZMANICH, Assistant Examiner

292—113